(12) United States Patent
Drake

(10) Patent No.: US 9,201,879 B2
(45) Date of Patent: Dec. 1, 2015

(54) METHOD, APPARATUS AND SYSTEM FOR GENERATING A FEATURE VECTOR

(71) Applicant: CANON KABUSHIKI KAISHA, Tokyo (JP)

(72) Inventor: Barry James Drake, Thornleigh (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/102,255

(22) Filed: Dec. 10, 2013

(65) Prior Publication Data

US 2014/0169681 A1 Jun. 19, 2014

(30) Foreign Application Priority Data

Dec. 13, 2012 (AU) ................................ 2012261715

(51) Int. Cl.
*G06K 9/46* (2006.01)
*G06K 9/66* (2006.01)
*G06F 17/30* (2006.01)

(52) U.S. Cl.
CPC .......... *G06F 17/30011* (2013.01); *G06K 9/468* (2013.01); *G06K 2209/01* (2013.01)

(58) Field of Classification Search
CPC ... G06F 17/30011; G06K 9/481; G06K 9/468
See application file for complete search history.

(56) References Cited

U.S. PATENT DOCUMENTS

| | | |
|---|---|---|
| 5,465,353 A | 11/1995 | Hull et al. |
| 6,078,915 A | 6/2000 | Okawa et al. |
| 8,036,497 B2 | 10/2011 | Kise et al. |
| 8,151,186 B1 | 4/2012 | Spasojevic et al. |
| 8,151,187 B1 | 4/2012 | Spasojevic et al. |
| 2008/0159590 A1* | 7/2008 | Yi et al. ........................ 382/103 |
| 2014/0257305 A1* | 9/2014 | Edwards et al. ................ 606/87 |
| 2014/0321755 A1* | 10/2014 | Iwamoto et al. .............. 382/197 |

* cited by examiner

*Primary Examiner* — Brian Le
(74) *Attorney, Agent, or Firm* — Canon USA, Inc. IP Division

(57) ABSTRACT

A method of generating a feature vector for an image is disclosed. Values are determined from a plurality of points in a region of the image, each of the values being determined using at least two of the plurality of points. A periodic sequence of the determined values is determined based on an order of the plurality of points. The periodic sequence is phase variant to a starting point of the ordered plurality of points, the order of the plurality of points being determined according to a predetermined rule. The feature vector for one of the points is generated from a frequency domain representation of the periodic sequence, the feature vector being invariant to rotation with respect to the plurality of points.

14 Claims, 14 Drawing Sheets

METHOD, APPARATUS AND SYSTEM FOR GENERATING A FEATURE VECTOR

REFERENCE TO RELATED PATENT APPLICATION(S)

This application claims the benefit under 35 U.S.C. §119 of the filing date of Australian Patent Application No. 2012261715, filed 13 Dec. 2012, hereby incorporated by reference in its entirety as if fully set forth herein.

TECHNICAL FIELD

The current invention relates to document retrieval and, in particular, to a method, apparatus and system for generating a feature vector. The present invention also relates to a computer program product including a computer readable medium having recorded thereon a computer program for generating a feature vector.

BACKGROUND

Image-based retrieval may be used for finding a text document in a database, given a query image of the document. An example of a query image is a webcam-captured image of a hard copy of the document. In an office environment, it is common to have a hard copy of a document that needs to be edited, or a single page from a document for which the remainder is needed. Image-based retrieval may be used to efficiently retrieve the original electronic document without requiring the corresponding hard copy document to contain barcodes or filenames.

The process of retrieving an image consists of processing a query image to extract information, referred to as "features" of the image, which can be used to identify the matching entry in a database index. The information is extracted in the form of a "feature descriptor", which is usually a vector of numerical values describing the feature. Various feature types have been used for image retrieval, including SIFT (Scale Invariant Feature Transform) and LLAH (Locally Likely Arrangement Hashing). Different features are configured to work for particular content types, and expected noise.

The performance of different feature types can be characterised in terms of accuracy of retrieval, speed of registration of images into a database, speed of retrieval of images from the database, and size of an associated database index. Databases of millions or billions of images exist, and more will be created over time. Methods for efficient and accurate retrieval and storage are needed to cope with the proliferation.

Retrieval of a text document from a database, given a query image, is usually performed by processing the query image to produce feature descriptors, and using the feature descriptors to look up a corresponding document in a database index.

A query document may include significant distortion, such as perspective distortion, crumpling, occlusion, noise and cropping. For this reason, features used for document retrieval are typically "local", meaning that the features only describe a part of the image. Even with distortion such as cropping and occlusion, some of the local features might still match. The features themselves are also usually configured to be invariant to certain types of distortion, such as affine geometric distortion or changes in illumination.

Features used for text document retrieval typically depend on shapes and relative positions of whole words, since optical character recognition may be impossible due to distortions of the query image. A good feature for text-based image retrieval is highly discriminative, such that the feature describes the image in a way that makes correct matches likely and incorrect matches unlikely. A good feature is also quick to calculate, and requires minimal storage. For example, a "locally likely arrangement hashing (LLAH)" feature extractor uses relative positions of words. The LLAH method is able to differentiate millions of pages, but suffers from poor memory efficiency.

A first step in extracting LLAH image features is to identify feature points, such that each LLAH feature point corresponds to the centre of a word. To create a feature descriptor for a feature point, positions of neighbouring feature points are used. Seven points are chosen to create a feature descriptor, excluding the point being described. A simple approach to selecting the feature points would be to choose seven nearest neighbours.

A feature descriptor may be generated from positions of the seven points by taking all combinations of four points from seven, and calculating a single value for the group of four points. The calculated value is useful as part of a feature descriptor due to its robustness to affine distortion of the input image. This is because areas of shapes are invariant to rotation, translation and shear, while the ratio of areas is invariant to scaling. However, if any three of the nearby points are collinear, then the feature descriptor for the feature point will be invalid, since the ratio will not be defined since there will be a divide by zero since one of the triangle areas is zero. Thus, in this instance, a feature descriptor contains thirty five (35) of the calculated values, which are ordered according to an arbitrary choice of starting point and the rotational ordering of the seven neighbouring points, relative to the feature point. The feature descriptor generated by the above process is one of seven possible feature descriptors, depending on which neighbouring point was chosen as the starting point.

The rotational ordering and use of all combinations of points allow the feature descriptor to capture the same values for a query image feature point as for the original image feature point. However, when features are extracted from a query image, the choice of starting point may not be the same as for the database image. To improve robustness, a feature descriptor is produced for each of the seven possible starting points in the rotational ordering.

As a result, the LLAH descriptor is highly informative. The individual feature values are robust to affine distortions of the image. However, the feature descriptors are not robust to errors in feature point detection, which changes the way points are used in the calculations, nor are the feature descriptors robust to rotation due to the arbitrary starting point. The feature descriptors also contain a high proportion of redundancy, since the feature descriptors consist of thirty-five (35) values calculated from the coordinates of seven (7) points. The redundancy results in high storage requirements.

An extension to the LLAH method adds rotational invariance. The extended method is structurally the same as the original LLAH descriptor using feature descriptors calculated in the same way. A difference is that rather than using an arbitrary neighbouring point as a rotational starting point, the extension to LLAH uses a standard starting point. The standard starting point allows the database to be probed a single time for each collection of neighbouring points used to create a descriptor, rather than once for each point, taken as a starting point. One method for choosing the standard starting point is to take each point in turn, and to calculate the LLAH invariant value for that point in combination with three following points. The point producing the highest value is used as the rotational starting point, with the values for subsequent points used for tie-breaking. Using the highest value allows single probing to be used, although it is sensitive to correct selection of the starting point. In practice, the starting point selection method is highly inaccurate in the case of affine distortion, which is the most significant advantage of the original LLAH method.

Another example of a document retrieval feature is "discrete point based signature". The discrete point based signatures differ from LLAH in that a preceding step is added to correct perspective distortion caused by the position of a camera relative to the document. After removing perspective distortions, known as deskewing, the discrete point based signatures feature descriptor finds a set of nearest neighbour points, orders the set of points according to radial distance, and then measures the angle between the centre and each of the nearest neighbour points. The use of absolute angles requires high accuracy in the deskew step, and becomes inaccurate when there are complex local distortions.

A further example of a document retrieval feature is a brick wall coding (BWC) feature type. BWC also uses a deskew step. However, the features use normalized lengths of words. The word length is more robust than angle to local distortion. However, the BWC method still relies on an accurate estimation of page angle in order to deskew the page.

SUMMARY

It is an object of the present invention to substantially overcome, or at least ameliorate, one or more disadvantages of existing arrangements.

According to one aspect of the present disclosure, there is provided a method of generating a feature vector for an image, the method comprising:

determining values from a plurality of points in a region of the image, each of the values being determined using at least two of the plurality of points;

determining a periodic sequence of the determined values based on an order of the plurality of points, the periodic sequence being phase variant to a starting point of the ordered plurality of points, the order of the plurality of points being determined according to a predetermined rule; and generating the feature vector for one of the points from a frequency domain representation of the periodic sequence, the feature vector being invariant to rotation with respect to the plurality of points.

According to another aspect of the present disclosure, there is provided an apparatus for generating a feature vector for an image, the apparatus comprising:

means for determining values from a plurality of points in a region of the image, each of the values being determined using at least two of the plurality of points;

means for determining a periodic sequence of the determined values based on an order of the plurality of points, the periodic sequence being phase variant to a starting point of the ordered plurality of points, the order of the plurality of points being determined according to a predetermined rule; and means for generating the feature vector for one of the points from a frequency domain representation of the periodic sequence, the feature vector being invariant to rotation with respect to the plurality of points.

According to still another aspect of the present disclosure, there is provided a system for generating a feature vector for an image, the system comprising:

a memory for storing data and a computer program;

a processor coupled to the memory for executing said computer program, said computer program comprising instructions for:

code for determining values from a plurality of points in a region of the image, each of the values being determined using at least two of the plurality of points;

code for determining a periodic sequence of the determined values based on an order of the plurality of points, the periodic sequence being phase variant to a starting point of the ordered plurality of points, the order of the plurality of points being determined according to a predetermined rule; and code for generating the feature vector for one of the points from a frequency domain representation of the periodic sequence, the feature vector being invariant to rotation with respect to the plurality of points.

According to still another aspect of the present disclosure, there is provided a computer readable medium having a computer program stored thereon for generating a feature vector for an image, the program comprising:

code for determining values from a plurality of points in a region of the image, each of the values being determined using at least two of the plurality of points;

code for determining a periodic sequence of the determined values based on an order of the plurality of points, the periodic sequence being phase variant to a starting point of the ordered plurality of points, the order of the plurality of points being determined according to a predetermined rule; and code for generating the feature vector for one of the points from a frequency domain representation of the periodic sequence, the feature vector being invariant to rotation with respect to the plurality of points.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
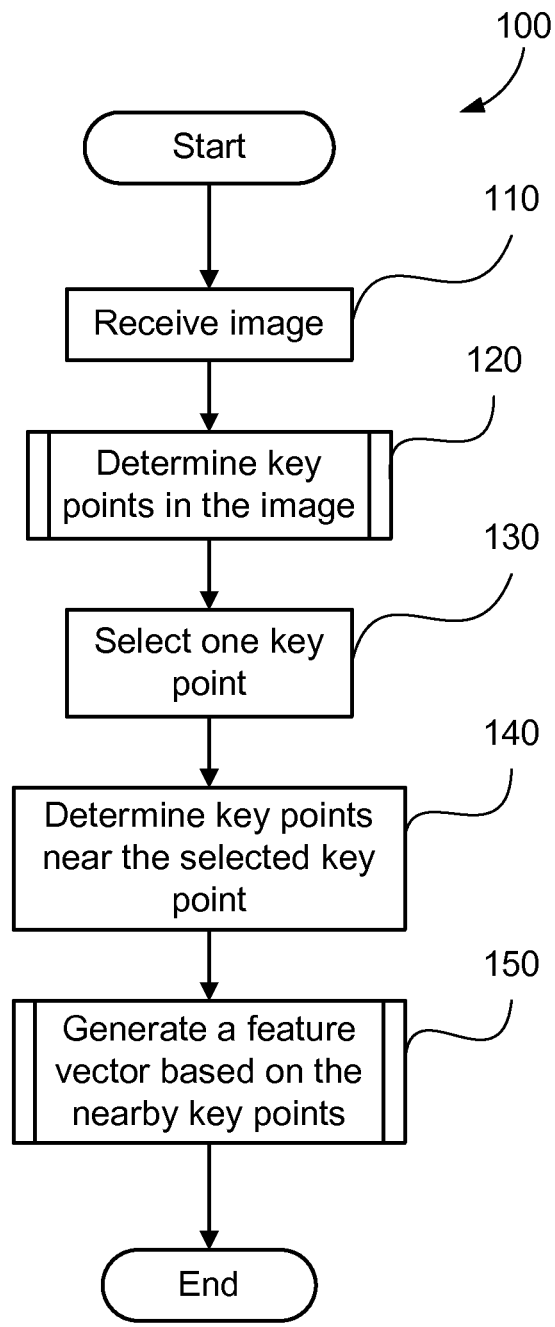
FIG. 1 is a schematic flow diagram showing a method of generating a feature vector from an image.

Where reference is made in any one or more of the accompanying drawings to steps and/or features that have the same reference numerals, those steps and/or features have for the purposes of this description the same function(s) or operation (s), unless the contrary intention appears.

Figure 13A:
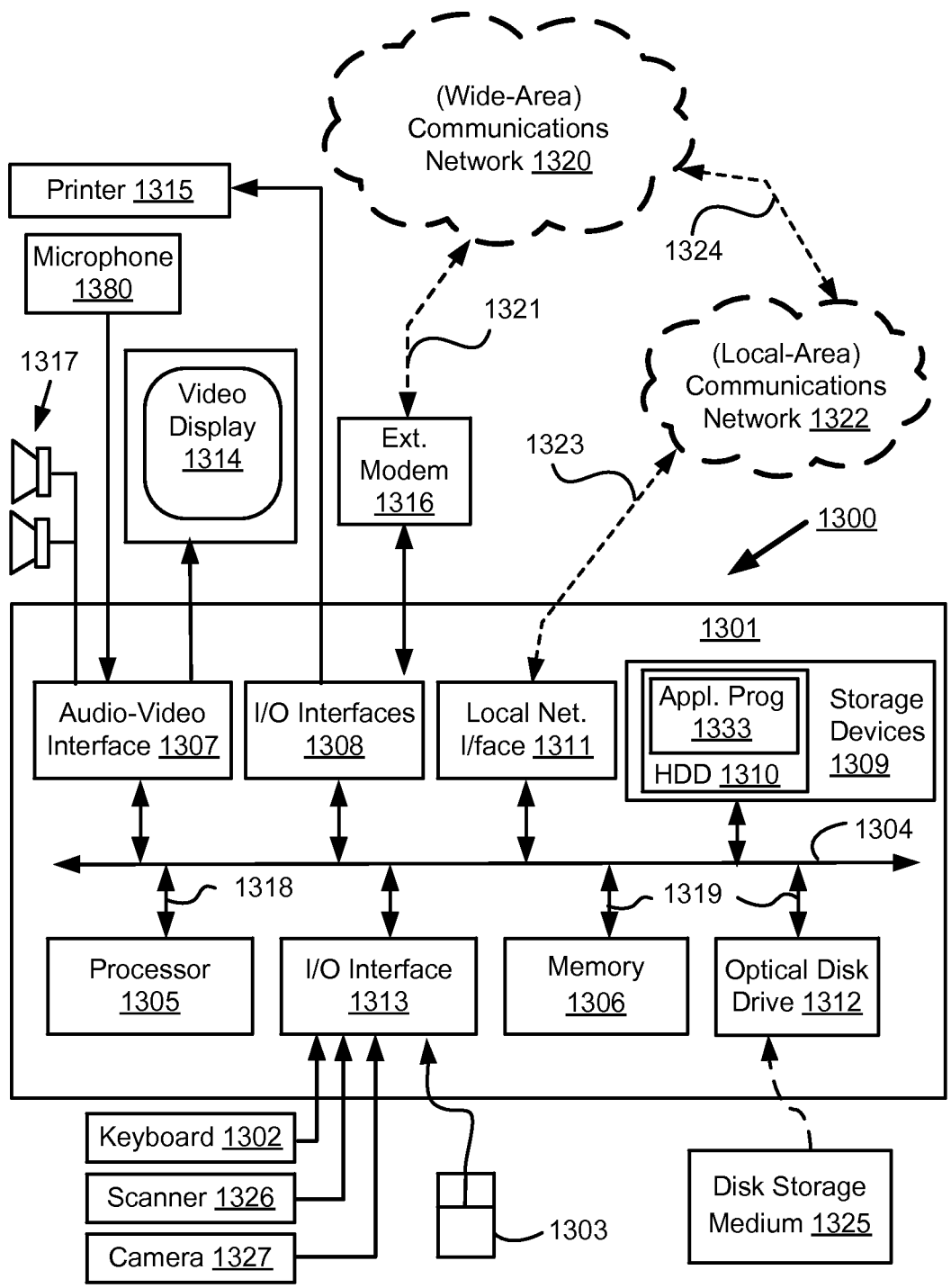
FIGS. 13A and 13B form a schematic block diagram of a general purpose computer system upon which arrangements described can be practiced.
Figure 13B:
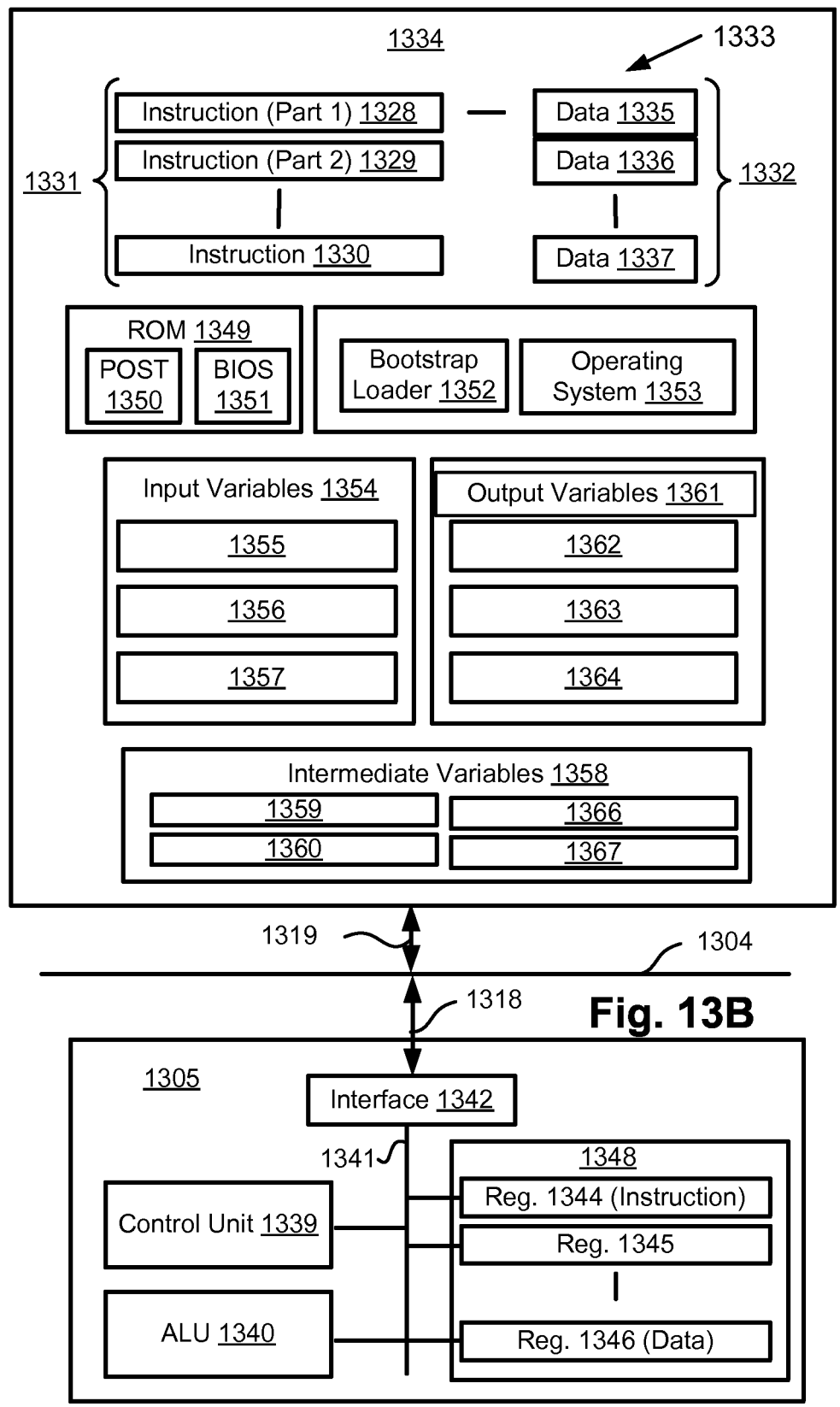

FIGS. 13A and 13B depict a general-purpose computer system 1300, upon which the various arrangements described can be practiced.

As seen in FIG. 13A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 13A, the local communications network 1322 may also couple to the wide network 1320 via a connection 1324, which would typically include a so-called "firewall" device or device of similar functionality. The local network interface 1311 may comprise an Ethernet circuit card, a Bluetooth™ wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or a like computer systems.

Methods described here may be implemented using the computer system 1300 wherein the processes of FIGS. 1 to 12, to be described, may be implemented as one or more software application programs 1333 executable within the computer system 1300. In particular, the steps of the described methods are effected by instructions 1331 (see FIG. 13B) in the software 1333 that are carried out within the computer system 1300. The software instructions 1331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1333 is typically stored in the HDD 1310 or the memory 1306. The software is loaded into the computer system 1300 from the computer readable medium, and then executed by the computer system 1300. Thus, for example, the software 1333 may be stored on an optically readable disk storage medium (e.g., CD-ROM) 1325 that is read by the optical disk drive 1312. A computer readable medium having such software or computer program recorded on the computer readable medium is a computer program product. The use of the computer program product in the computer system 1300 preferably effects an advantageous apparatus for implementing the described methods.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 13B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 13A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 13A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 13A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 13B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 13A. The execution of a set of the instructions may in some cases result in output of data. Execution may also involve storing data or variables to the memory 1334.

The disclosed arrangements use input variables 1354, which are stored in the memory 1334 in corresponding memory locations 1355, 1356, 1357. The disclosed arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 13B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

a fetch operation, which fetches or reads an instruction 1331 from a memory location 1328, 1329, 1330;

a decode operation in which the control unit 1339 determines which instruction has been fetched; and an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 1 to 12 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 6:
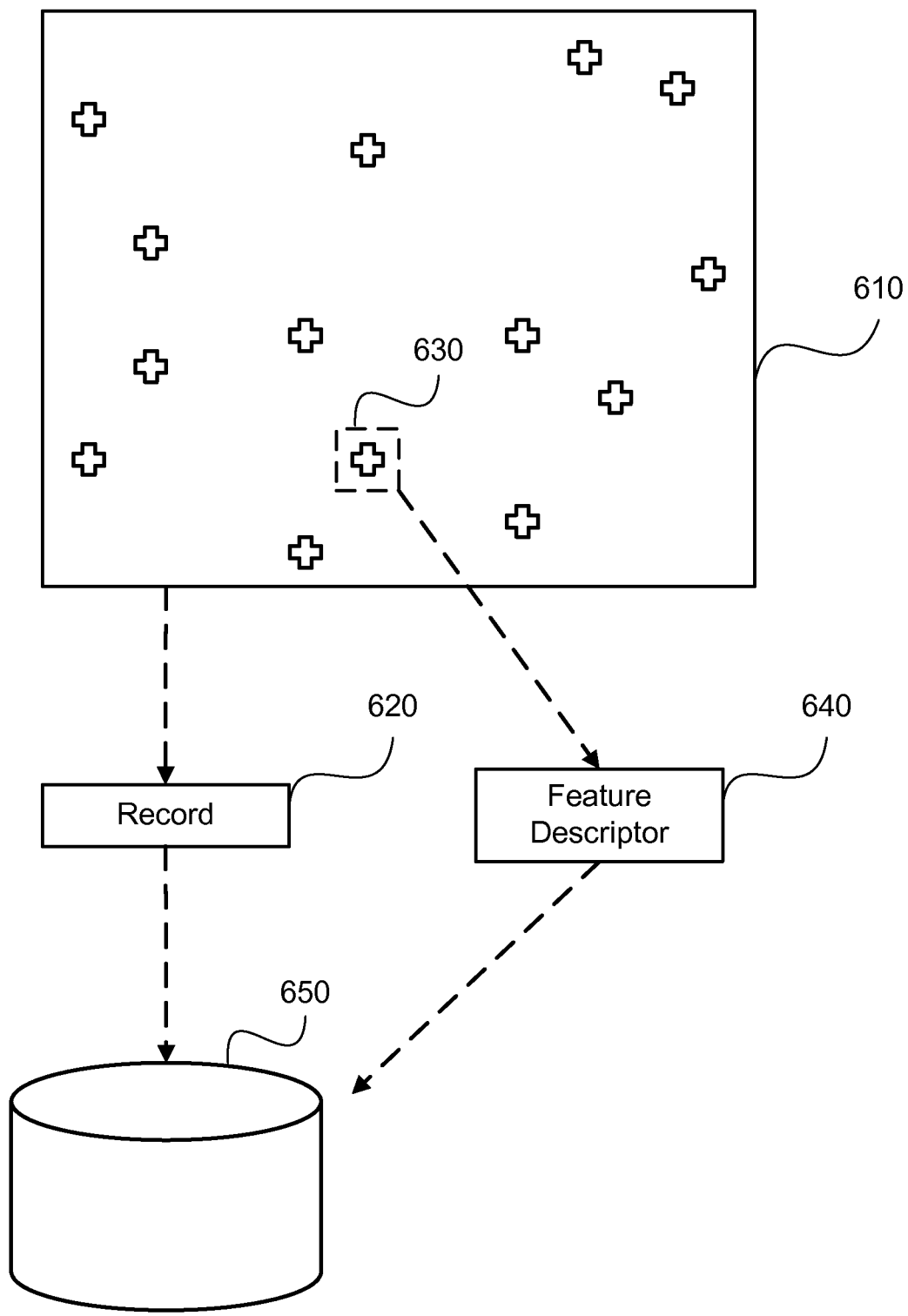
FIG. 6 shows an example of an image, a key point within the image, a feature vector associated with the key point, and storage of an association between the data and the key point.

FIG. 6 shows an example image 610 comprising associated data 620 (e.g., a record in a database). The image 610 may be processed by a feature extractor, which identifies a region 630 of the image 610, and determines a feature descriptor 640. The feature descriptor 640 may be in the form of a feature vector. An association may then be made in a database 650 (e.g., configured within the hard disk drive 1310) between the feature descriptor 640 and the record 620. A feature descriptor and association are determined for other identified image regions, with the database 650 storing all of the determined associations between feature descriptors 640 and records 620. Once the database 650 is complete, the database may be used to determine if a new feature descriptor matches a previously entered feature descriptor. If a matching feature descriptor exists in the database 650, the data associated with the stored feature descriptor may be retrieved for further processing or display. For example, in a document retrieval system the database stores features corresponding to the managed documents. A user may then provide an image of a query document and the feature descriptors may be compared to the feature descriptors in the database to determine the identity of the document.

Figure 7:
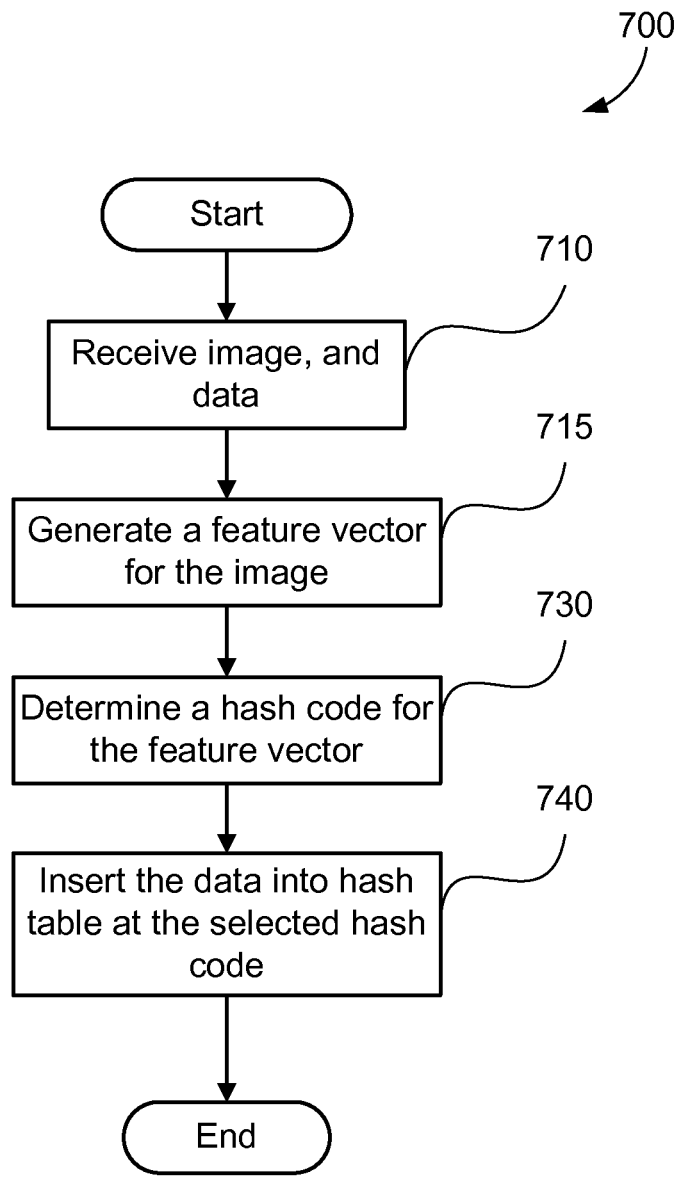
FIG. 7 is a schematic flow diagram showing a method of storing data associated with an image in a hash table.

A method 700 of storing data associated with an image in a hash table will now be described with reference to FIG. 7. The method 700 uses a feature vector generated from an image to store the data. Alternatively, the method 700 may use any suitable type of feature descriptor, other than a feature vector, such as a graph consisting of nodes and arcs, or a matrix. The method 700 may be implemented as one or more code modules of the software application program 1333 resident on the hard disk drive 1310 and being controlled in its execution by the processor 1305.

The method 700 begins at image receiving step 710, where the processor 1305 receives an image for insertion, and data associated with the received image. In one arrangement, the data may be a Universal Resource Identifier (URI) for a document associated with the image. The image may be a rendered page in the document. Alternatively, the data may be a unique identifier, where the unique identifier is used to access records in a relational database, for example, configured within the hard disk drive 1310. The data may include ownership details or information about processes the image is involved in (e.g., who printed the image, or where and when the image was printed).

Following step 710 the method 700 proceeds to vector generating step 715 where the processor 1305 is used for generating a feature vector from the image. The generated feature vector may be stored in the memory 1306. A feature vector is a fixed length array of numerical values, which may be interpreted as a vector in a high dimensional space. A feature vector represents an image, or a portion of an image. The terms "feature vector", "feature descriptor" and "feature point" may be used interchangeably to refer to such an array of numerical values, depending on whether the focus is on the source image or on a geometric interpretation of the array. In the case that a feature vector represents a portion of an image, the portion may be indicated by reference to a "key point". The key point indicates a centre of the portion of the image which the feature vector represents. A method 100 of generating a feature vector from an image, as executed at step 715, will be described in detail below with reference to FIG. 1.

The method 700 then proceeds from step 715 to hash code determining step 730 where a hash code is determined for the feature vector. The determined hash code may be stored in the memory 1306. The hash code supports retrieval of "similar" feature vectors. Feature vectors may be considered to be similar when a Euclidean distance for the feature vectors is small. In one arrangement, a hash function used to generate the hash code at step 715 is "locality sensitive".

A locality sensitive hash function is one which produces the same hash code for vectors which have a small Euclidean distance. The hash function partitions the high-dimensional space into regions. An example of a locality sensitive hash function is a dot product, followed by quantization, where the feature vector for the dot product is selected at random at the time of initialising the hash table.

An alternative locality sensitive hash function used at step 730 is a lattice decoder, such as the A* lattice decoder. A lattice is set of regularly spaced points. The process of finding a closest lattice point to a given point is referred to as "decoding". A hash code may be determined for a feature vector at step 730 by associating a lattice point closest to the feature vector. As each lattice point can be represented by a unique hash value, any feature vector associated with a lattice point will have the hash value of the associated lattice point.

Following step 730 the method 700 proceeds to record inserting step 740 where the processor 1305 inserts a record into a hash table, using the hash code determined in step 730 as a key. The hash table may be configured within the memory 1306. The record contains the data associated with the image as received at step 710. Alternatively, the record contains an identifier for the associated data. The record may also contain a representation of the feature vector for future comparison. The method 700 concludes following step 740. In the case where the stored feature vector represents only a portion of an image, the method 700 may be repeated for remaining image portions.

Figure 8:
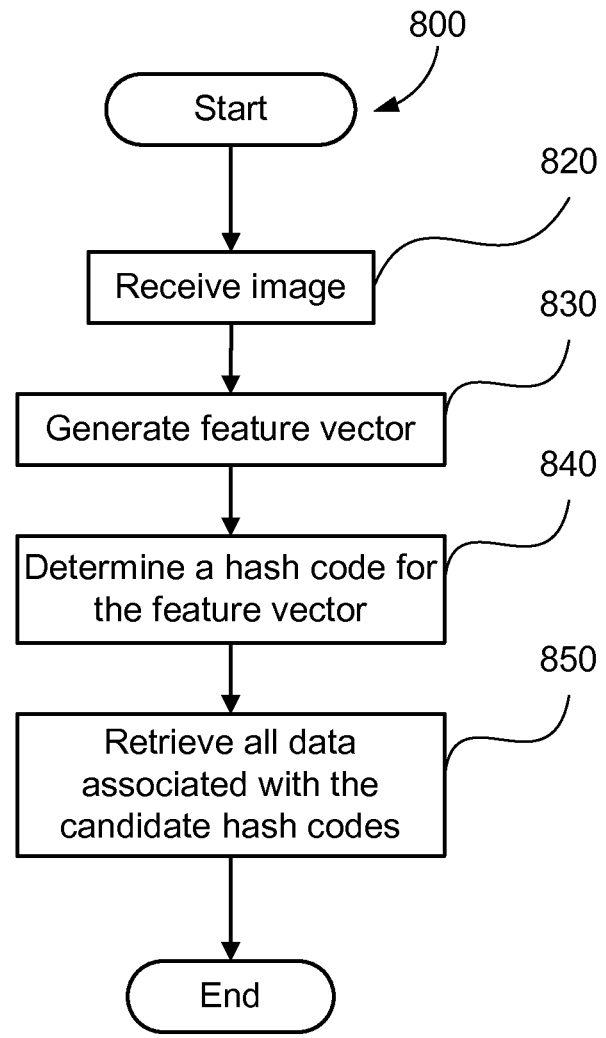
FIG. 8 is a schematic flow diagram showing a method of retrieving data associated with an image from a hash table.

A method 800 for retrieving data associated with an image from a hash table, will now be described with reference to FIG. 8. The method 800 uses feature vectors to retrieve the data. Alternatively, the method 800 may use any suitable type of feature descriptor, other than a feature vector. The method 800 may be implemented as one or more code modules of the software application program 1333 being resident on the hard disk drive 1310 and being controlled in its execution by the processor 1305.

The method 800 begins at image receiving step 820, where the processor 1305 receives an image of a document which is to be retrieved. In one arrangement, the image is a scan of a printed copy of the document.

Following step 820 the method 800 proceeds to feature vector generating step 830 where the processor 1305 is used for generating a feature vector from the image. The feature vector is generated at step 830 using the method 100 as at step 715 of the method 700.

The method 800 then proceeds from step 830 to determining step 840 where a hash code is determined for the feature vector. The determined hash code may be stored in memory 1306. The hash code may be determined at step 840 using any of the methods of determining the hash code as described above with reference to step 730 of the method 700. In the case of a lattice based hash function, multiple hash codes may be determined at step 840, using the Delaunay cell of an associated lattice. Multiple hash codes may be used to determine vectors which are nearby within feature space (i.e., as represented by the Euclidean distances between the vectors). However, a different hash code is determined in step 730 described above than at step 840 due to boundaries between hash code regions.

Following step 840, the method 800 proceeds to retrieving step 850, where the data associated with the determined hash codes is retrieved from the hash table configured within the memory 1306. The retrieval method 800 concludes following step 850, with data which matches the image received at step 820 having been retrieved from the hash table.

In one arrangement, the retrieval method 800 may be followed by a scoring method, which combines retrieval results from multiple image patches to determine a matching image. An example of a scoring method is to count occurrences of an image id, and return the image with the highest count. The scoring method may also include a detailed comparison between a query feature vector, and a feature vector generated from an image associated with retrieved data in order to weight results. For example, in one implementation, feature vectors generated in accordance with the described methods may be used for identifying a document. The document may be identified by matching the feature vectors, generated from an image of the document, with one or more other query feature vectors. Relative scores may be applied to the generated feature vectors based on any such matches. The software application 1333 may be configured for accumulating the scores based on matching feature vectors and identifying the document based on the accumulated scores.

Figure 12:
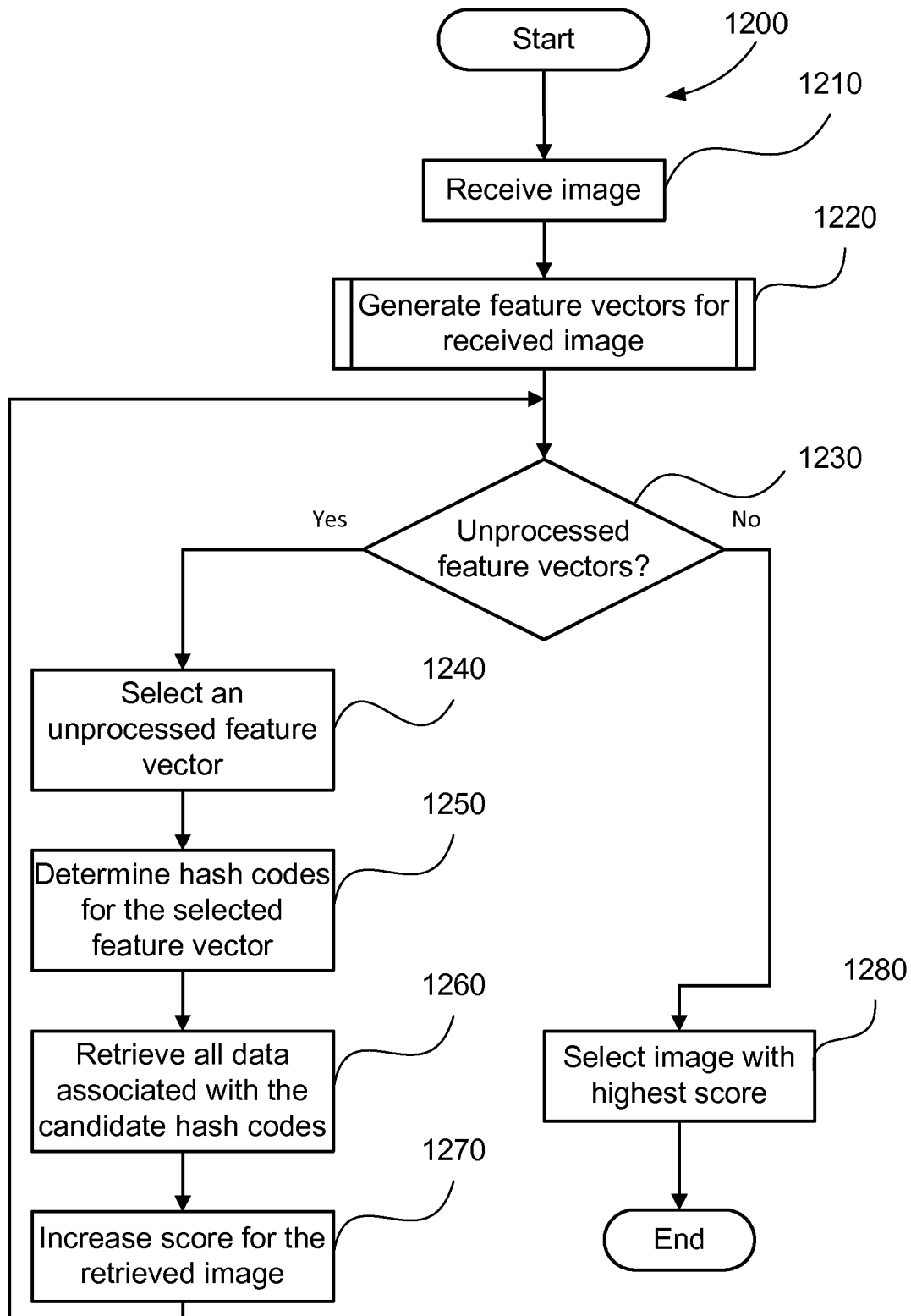
FIG. 12 is a flow diagram showing a method of retrieving a matching image using accumulated scores.

A method 1200 of retrieving a matching image using accumulated scores will now be described with reference to FIG. 12. The method 1200 may be implemented as one or more code modules of the software application program 1333 being resident on the hard disk drive 1310 and being controlled in its execution by the processor 1305.

The method 1200 begins at receiving step 1210, where the processor 105 receives an input image representing an image stored, for example, within a database (e.g., the database 650) configured within the hard disk drive 1310. The received image may be stored by the processor 105 within the memory 1306.

Following step 1210, the method 1200 proceeds to step 1220, where feature vectors are generated from the received image using a feature extraction method. The feature vectors may be generated at step 1220 in accordance with the method 100 which will be described in detail below. The generated feature vectors may be stored in memory 1306.

The method 1200 then proceeds from step 1220 to step 1230, where if the processor 105 determines that there are unprocessed feature vectors, then the method 1200 proceeds to step 1240. Otherwise the method 1200 proceeds to step 1280.

At step 1240, one of the unprocessed feature vectors is selected from memory 1306. The method 1200 then proceeds from step 1240 to step 1250 where a set of hash codes is determined for the selected feature vector.

Following step 1250, the method 1200 proceeds to step 1260, where all feature vector data associated with the determined hash codes is retrieved from the hard disk drive 1310 (e.g., from the database 650). The method 1200 then proceeds from step 1260 to step 1270 where the retrieved data is used to increase a "match score" for one of the images stored within the database 650 using the retrieved data based on the stored image matching the received image. In one arrangement, the match score for an image stored within the database 650 is incremented by one based on the stored image matching the received image. Such an arrangement is equivalent to counting votes. In another arrangement, the Euclidean distance between a feature vector generated at step 1220 for the image received at step 1210, and a feature vector stored in the database 650 for a stored image. The determined Euclidean distance may be inputted to a score function. The score function may be a hinge loss function, or a Gaussian function. After increasing the scores at step 1270, the method 1200 returns to the unprocessed feature decision step 1230. If at step 1230, there are no remaining unprocessed feature vectors, the method 1200 proceeds to step 1280. At step 1280, the image stored within the database 650 with the highest score is selected as a matching image. The method 1200 concludes following step 1280.

The method 100 of generating a feature vector from an image, as executed at either of steps 715 and 830, will now be described below with reference to FIG. 1. The method 100 may be used for generating a suitable feature vector from the image. The generated feature vector exists in a high dimensional space, and may be determined to match one or more other feature vectors (e.g., one or more query feature vectors), or not, as described above based on Euclidean distance. Therefore, the generated feature vector satisfies the following two properties.

First, the generated feature vector is discriminative (i.e., non-similar image regions produce feature vectors that have a large Euclidean distance between the feature vectors).

Second, the generated feature vector is stable to expected noise (i.e. image regions which are similar produce feature vectors having a low Euclidean distance between the feature vectors, even in the presence of noise in the images).

The method 100 generates a feature vector for an image by locating key points in the image. The geometric arrangement of the identified key points is assumed to be repeatable and discriminative. The method 100 may be used to describe the key point geometry in a manner which is compact, and robust to noise. English language text documents are an example of images which are suitable for feature extraction using key point geometry.

Figure 9A:
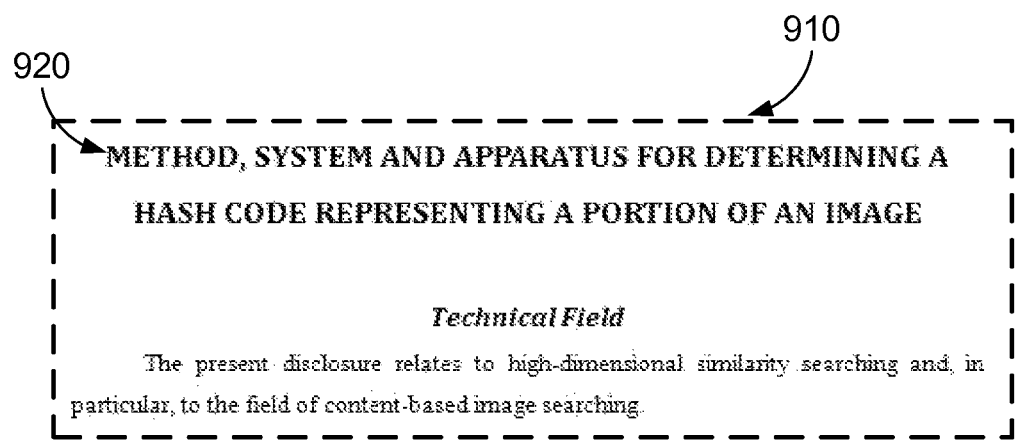
FIG. 9A shows an image of a text document, containing words of English text.
Figure 9B:
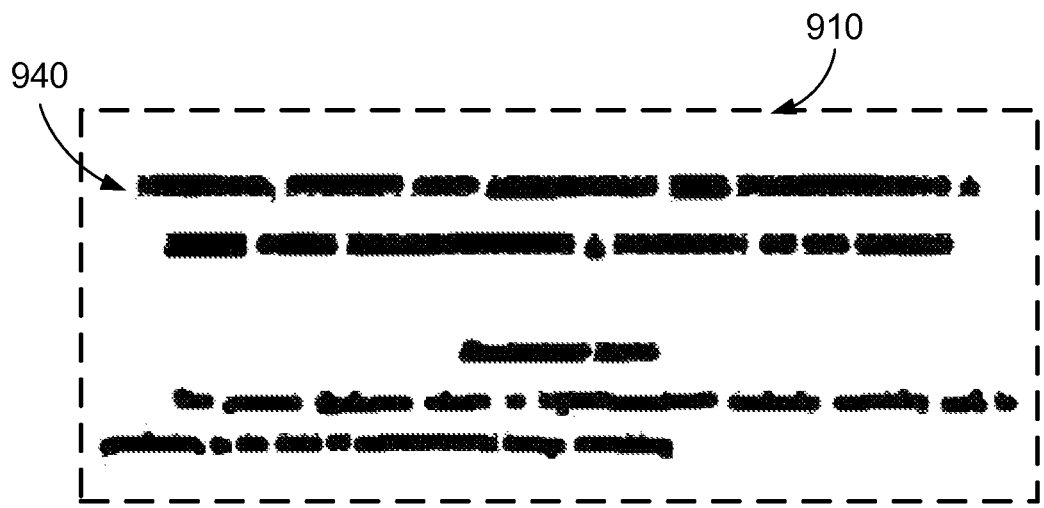
FIG. 9B shows a binarized version of the image of FIG. 9A with character detail removed.

In FIG. 9A, an English language document 910 contains words (e.g., 920), which are separated from each other by whitespace. FIG. 9B shows the document 910 in which the character detail has been obscured (or removed). Even with the text character detail obscured, the layout of the overall obscured words 940 is sufficient to identify the document 910. In the example of FIGS. 9A and 9B, the centre of mass of each word (e.g., 940) may be considered to be a key point, so that the key points represent locations of the words. Further, the spacing of near-by words may be used to create a feature vector.

The method 100 generates a feature vector for an image from the locations of key points in the image. The method 100 uses the normalised area of triangles formed from three (3) key points. Since area is invariant under translation, rotation and shear, and since ratios of areas (including normalised areas) are invariant under scaling, determined area values are invariant to affine distortion of the locations of the key points. The feature vector determined for an area value is therefore also affine invariant.

Distortions due to damage to a page, and capture of a camera image of the page are approximately affine distortions. Therefore, the generated feature vector is robust to the expected distortions in a query image. The feature vector may be constructed from the normalized triangle areas in order to generate a feature vector which is invariant to rotation of original key points.

The method 100 may be implemented as one or more code modules of the software application program 1333 being resident on the hard disk drive 1310 and being controlled in its execution by the processor 1305.

The method 100 begins at image receiving step 110, where the processor 1305 receives an image. The image may be stored in RAM 1360. The image received at step 110 may be the image received at either of steps 710 or 820.

Following step 110 the method 100 proceeds to key point determining step 120 where the processor 1305 is used for determining key points in the image. A method 300 of determining key points in an image, as executed at step 120, will be described in detail below with reference to FIG. 3. The method 300 may be referred to as a "word centroid" detector method and is suitable for documents containing English text.

After step 120, the method 100 proceeds to key point selecting step 130, where the processor 1305 is used for selecting one of the determined key points to indicate a location in the image around which to describe the geometry of key points. In one arrangement, the selection of the key point at step 130 occurs inside a loop, which generates a feature vector for each possible selected key point. An alternative to looping over each possible selected key point is to randomly select keypoints up to a predetermined number of key points. In still a further alternative, key points which are greater than a threshold distance from the edge of an image may be selected at step 130, since key points at the edge may be unreliable due to cropping.

After a key point of the image has been selected in step 130 the method 100 proceeds to key point determining step 140. At step 140, the processor 1305 determines a predetermined number of key points near-by the selected key point. The key points determined at step 140 are a set of key points which have a smallest distance to the selected key point. The determined set of key points may be stored within memory 1306.

In an alternative arrangement, one more than a predetermined number of near-by keypoints may be determined at step 140. Such extra key point may then be removed. Such an alternative arrangement provides robustness to noise which may cause an incorrect near-by key point to be found, for example based on marks on the image.

Once the key points have been determined at step 140, the determined key points are passed to vector generating step 150. At step 150, a feature vector, which describes the layout of near-by key-points, is generated using a high dimensional feature vector. The generated featured vector has the required properties of being discriminative and robust. A method 200 of generating a feature vector based on a set of key points, as executed at step 150, will be described in detail below with reference to FIG. 2. The method 100 concludes following step 150

Figure 3:
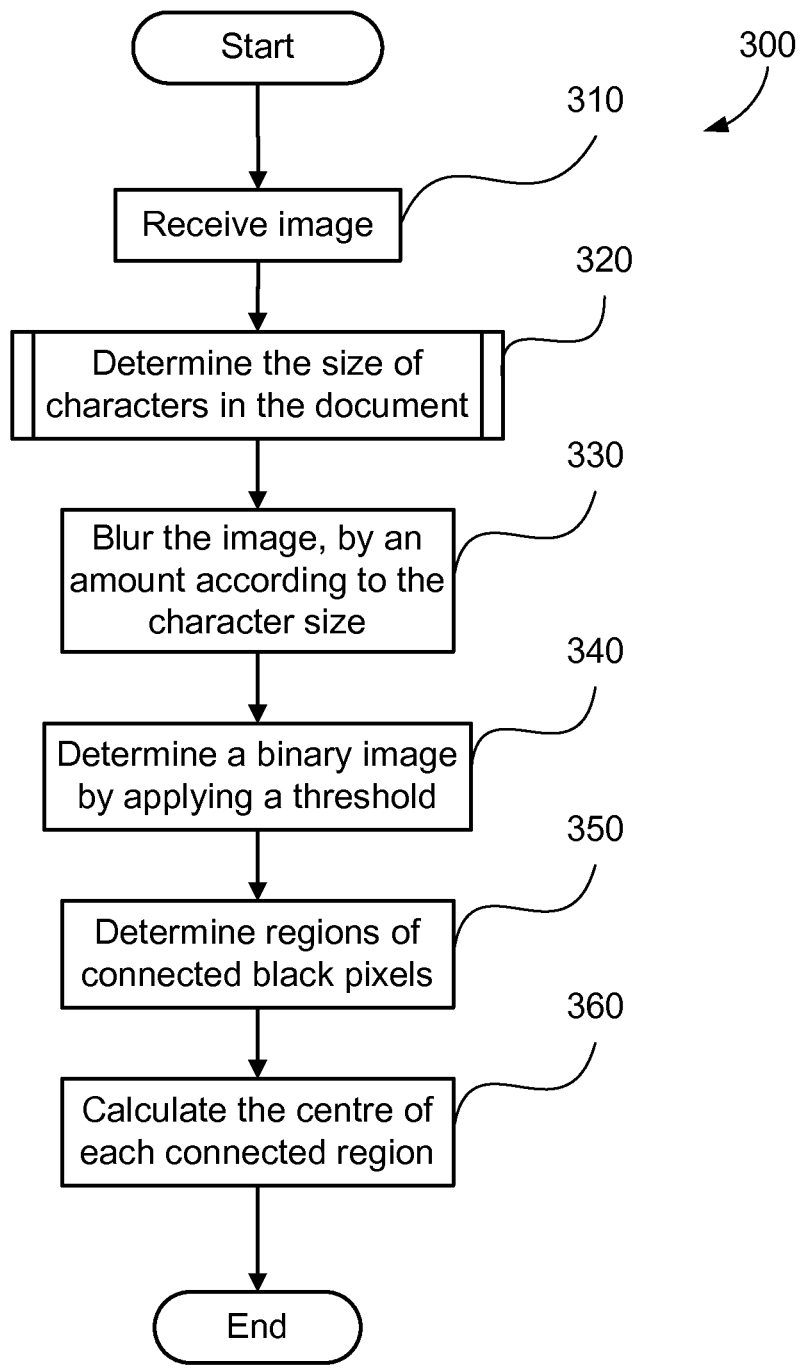
FIG. 3 is a schematic flow diagram showing a method of determining key points in an image.
Figure 4:
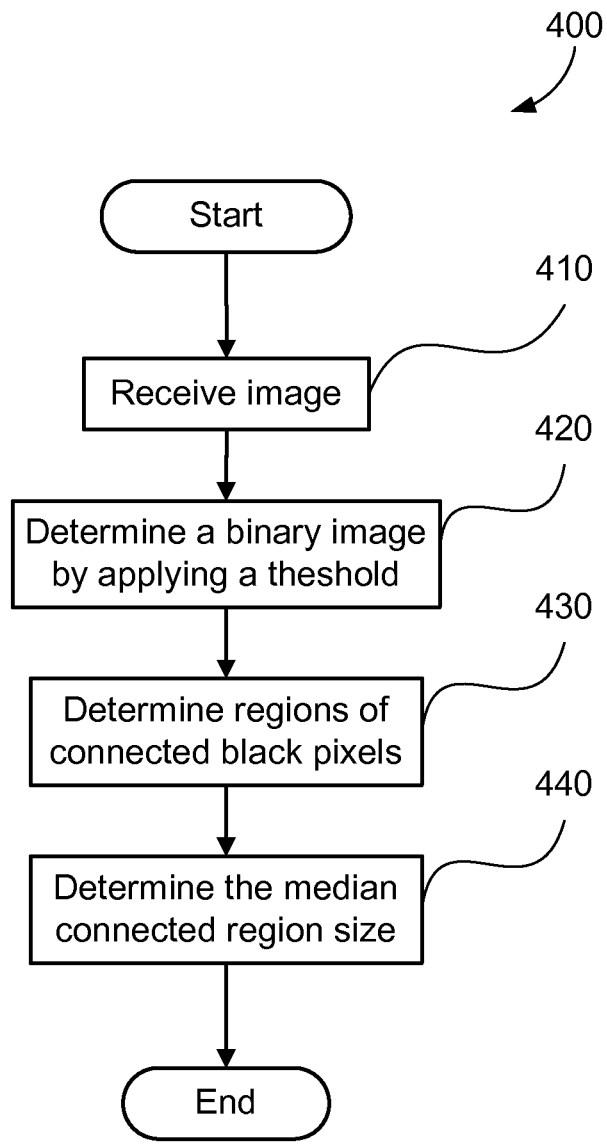
FIG. 4 is a schematic flow diagram showing a method of determining size of printed characters in an image.

The method 300 of determining key points in an image, as executed at step 120, will now be described with reference to FIG. 3. The method 300 may be implemented as one or more code modules of the software application program 1333 resident on the hard disk drive 1310 and being controlled in its execution by the processor 1305. The key-point detection method 300 produces key-points which correspond to the centre of mass of words in the image.

The method 300 begins at image receiving step 310, where the processor 1305 receives an image. The image may be stored in RAM 1360 by the processor 1305. The image received at step 310 is the image received at step 110.

Following step 310 the method 300 proceeds to size determining step 320 where the processor 1305 is used for determining the size of characters in a document represented in the image. Also at step 320, a dominant character size (i.e., font size) is determined for the document. A method 400 of determining size of printed characters in an image, as executed at step 320, will be described in detail below with reference to FIG. 4.

The method 300 then proceeds from step 320 to blur applying step 330 where the determined character size is used to define a blur kernel. The blur kernel is applied to the image. The purpose of blurring the image is to remove detail of individual letters. The blur kernel is a Gaussian function, with standard deviation proportional to the character size. In order to blur the image, the Gaussian function is convolved with the image received at step 310. The blurred image may be stored in the memory 1306.

Following step 330 the method 300 proceeds to threshold applying step 340, where a threshold is applied to the blurred image to determine a binary image. The binary image may be stored in memory 1306 by the processor 1305. The threshold used at step 340 may be predetermined. Alternatively, the threshold used at step 340 may be determined for each pixel of the image based on statistics of neighbouring pixels, which is known as an adaptive threshold. After producing the binary image in step 340 the method 300 proceeds to step 350.

At image segmenting step 350, the processor 1305 is used for segmenting the binary image in to regions of connected black pixels. Since the character detail was blurred in step 330, each connected region of black pixels determined in step 350 corresponds to a single word or an unbroken line of text.

Following step 350, the method 300 proceeds to determining step 360, where the processor 1305 determines where the centre of mass (i.e., centroid) of each word in the image is located. The method 300 concludes following step 360 with each centroid being returned as a key-point. The determined centroids may be stored in memory 1306.

Figure 5:
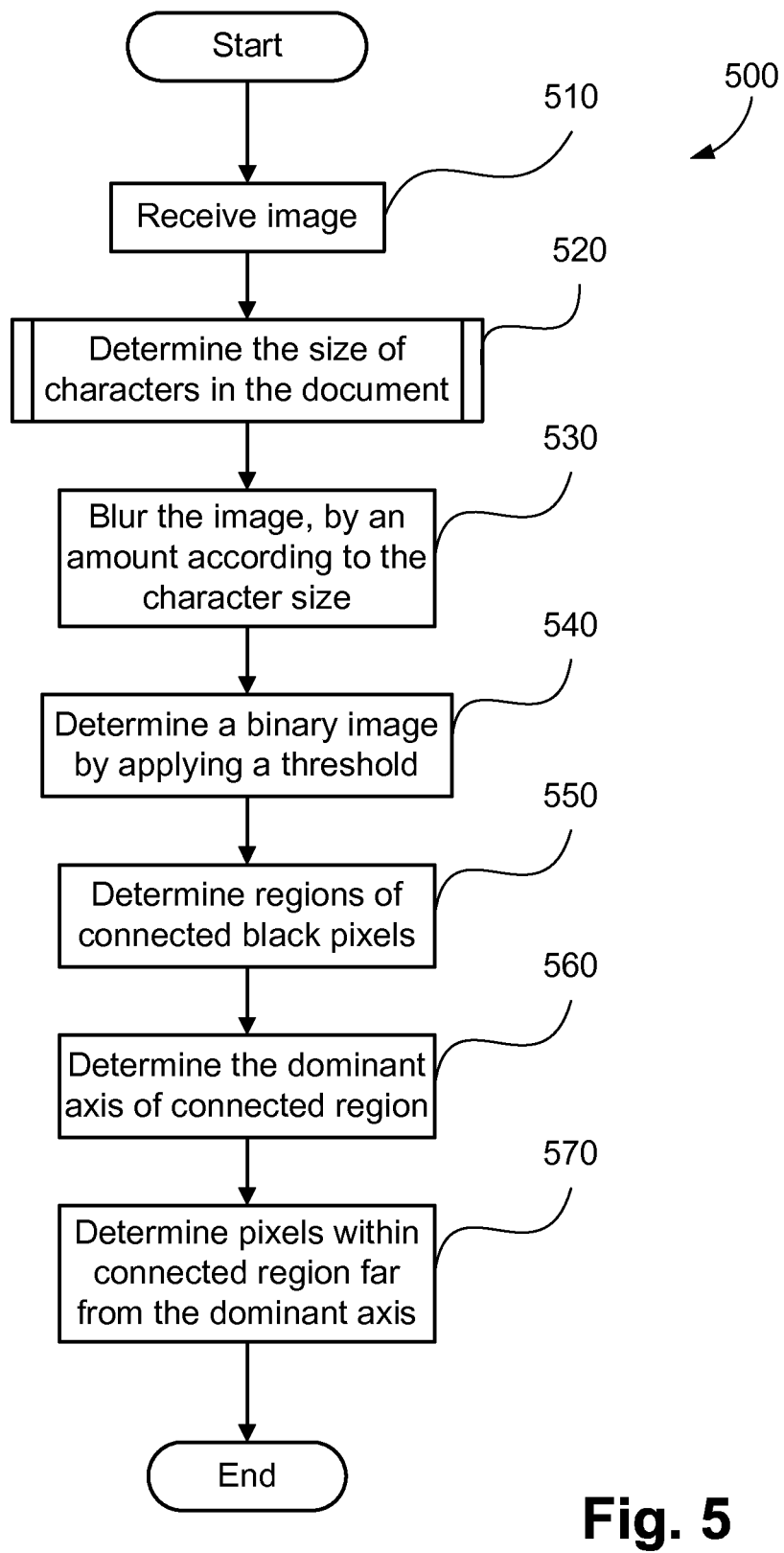
FIG. 5 is a schematic flow diagram showing a method of determining key points in an image.

An alternative method 500 of determining key points in an image, will now be described with reference to FIG. 5. The method 500 may be executed at step 120 of the method 100. The method 500 determines key points which correspond to locations of letter extenders and descenders in words. The key points may be locations of letter extenders. An extender is a letter which rises above the average height of characters. An example of an extender is the letter '1' in English. The key points may also be locations of letter descenders. A descender is a letter which extends below a line, such as the letter 'q'. The use of extenders/descenders as key points is appropriate in languages such as Thai, which has prominent extenders and tittles, but does not contain word breaks.

The method 500 may be implemented as one or more code modules of the software application program 1333 resident on the hard disk drive 1310 and being controlled in its execution by the processor 1305.

The method 500 begins at image receiving step 510, where the processor 1305 receives an image. The image may be stored in RAM 1360. The image received at step 310 is the image received at step 110.

Following step 510 the method 500 proceeds to size determining step 520 where the processor 1305 is used for determining the size of characters in a document represented in the image, in accordance with the method 400. Also at 520, a dominant character size (i.e., font size) is determined. The method 500 then proceeds from step 520 to step 530 where the determined character size is used to define a blur kernel which is applied to the image. As described above, the purpose of blurring the image is to remove the detail of individual letters.

Following step 530 the method 500 proceeds to threshold applying step 540 where a threshold is applied to the blurred image to determine a binary image. Again, the binary image determined at step 540 may be stored in memory 1306. The threshold used at step 530 may be predetermined. Alternatively, the threshold used at step 530 may be determined for each pixel based on statistics of neighbouring pixels, which is known as an adaptive threshold. After determining the binary image in step 540, the method 500 proceeds to image segmenting step 550.

At step 550, the processor 1305 is used for segmenting the binary image in to regions of connected black pixels. Again, since the character detail was blurred in step 530, each connected region of black pixels determined in step 550 may correspond to a single word or a line of text.

Following step 550 the method 500 proceeds to dominant axis determining step 560 where the processor 1305 is used to determine a dominant axis of each black region determined in step 550. The dominant axis indicates the direction of a line of text in the document represented in the image received at step 510. The method 500 then proceeds from step 560 to pixel detecting step 570 where the processor 1305 is used for detecting pixels which are far from the dominant axis of each connected region. The pixels detected at step 570 are identified as feature points. The pixels may be detected at step 570 based on a predetermined threshold distance. The threshold distance for identifying an extender/descender may be based on the character size determined in step 520, such that the smaller the determined character size, the smaller the threshold distance is determined to be. The method 400 of determining size of printed characters in an image, as executed at either of steps 320 or 520, will now be described with reference to FIG. 4. The method 400 may be implemented as one or more code modules of the software application program 1333 resident on the hard disk drive 1310 and being controlled in its execution by the processor 1305.

The method 400 begins at step 410, where the processor 1305 receives an image on which to determine the character size. The image may be stored in RAM 1360 by the processor 1305. The image received at step 410 is the image received at step 310 or step 510.

Following step 410 the method 400 proceeds to threshold applying step 420 where a threshold is applied to the received image by the processor 1305 to determine a binary image. The binary image may be stored in memory 1306 by the processor 1305. The threshold used at step 420 may be predetermined. Alternatively, the threshold used at step 420 may be determined for each pixel based on statistics of neighbouring pixels, which as described above is known as an adaptive threshold. After determining the binary image in step 420, the method 400 proceeds to image segmenting step 430.

At step 430, the binary image determined at step 420 is segmented in to regions of connected black pixels. Then at following measuring step 440, the number of pixels in each region of black pixels is measured, and a median number of pixels in each region is determined as a median connected region size. The median connected region size is returned to the method 300 as the size of the printed characters within the image received at step 410. The determined median connected region size may also be stored in memory 1306.

The method 200 of generating a feature vector based on a set of key points, as executed at step 150, will now be described with reference to FIG. 2. The method 200 will be described by way of example with reference to FIGS. 10A, 10B, 10C and 11. The method 200 may be implemented as one or more code modules of the software application program 1333 resident on the hard disk drive 1310 and being controlled in its execution by the processor 1305.

Figure 10A:
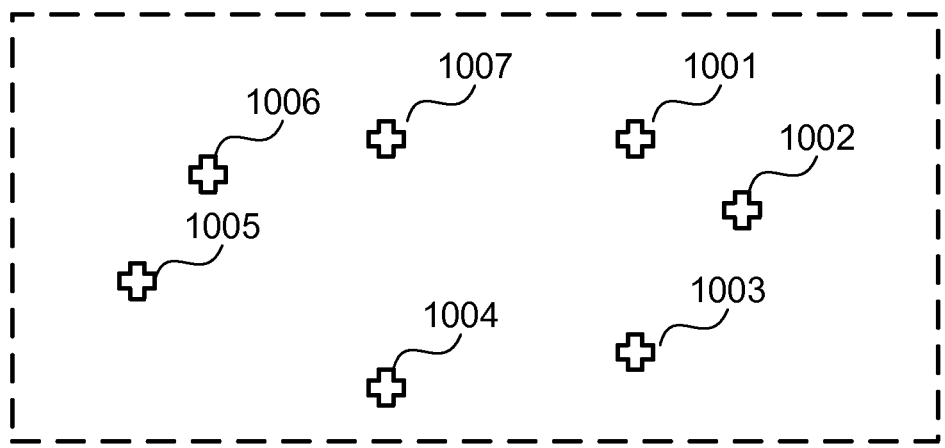
FIG. 10A shows one example of key points in an image.

The method 200 begins at key point receiving step 210, where the processor 1305 receives a set of key points. The set of key points includes a plurality of points in a region of the image received at step 110. The key points of the set are represented as x and y locations in the image received at step 110 of the method 100. The set of key points received at step 210 are the set of key points determined at step 140 of the method 100 and stored in memory 1306. As an example, FIG. 10A shows seven key-points 1001, 1002, 1003, 1004, 1005, 1006 and 1007.

Following step 210, the method 200 proceeds to a key point rearranging step 220, where the plurality of key points of the set are rearranged, with the order of the key points being determined according to a predetermined rule. In one arrangement, the predetermined rule is "clockwise" so that the plurality of key points of the set are rearranged in a clockwise order using the processor 1305. In the example of FIGS. 10A, the points 1001, 1002, 1003, 1004, 1005, 1006 and 1007 have been ordered clockwise, such that point 1001 is in a first position, point 1002 is in a second position, point 1004 is in a third position, point 1005 is in a fourth position, point 1005 is in a fifth position, point 1006 is in a sixth position, and point 1007 is in a seventh position. The clockwise ordering of the key-points imparts a property that a rotation of the image creates a rotation of the key-points.

In another arrangement, the predetermined rule is "anticlockwise" so that the plurality of key points of the set are rearranged in an anticlockwise order at step 220. Anticlockwise ordering also imparts the property that a rotation of the image creates a rotation of the key-points. Anticlockwise ordering may be used at step 220 in place of a clockwise ordering. The ordering of the key points is performed at step 220 so that a feature vector generated in accordance with the method 200 is invariant to the rotation of the image received at step 110.

Figure 10B:
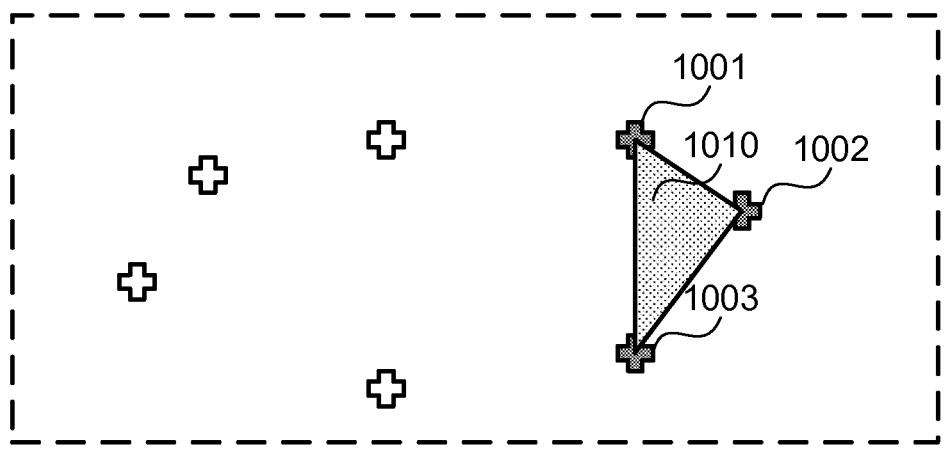
FIG. 10B shows a triangle formed by three selected key points of the image of FIG. 10A.

The method 200 proceeds from step 220 to a value determining step 230, where the processor 1305 is used for determining values using the ordered set of key points determined at step 220. As described above, the set of key-points includes the plurality of points in a region of the image received at step 110. Each of the values is determined at step 230 using at least two of the plurality of points in the ordered set of key-points. In one arrangement, the determined values represent areas of normalized triangles and may be stored in the memory 1306. The normalized triangle areas may be determined by generating triangles from every possible combination of three ordered key points of the ordered set of key points. The area of each triangle is determined FIG. 10B shows an example where the first key-point 1001, the second key point 1002, and the third key point 1003 have been selected for determining a triangle 1010. The area of the triangle 1010 may be determined in accordance with Equation (1), below:

$$\frac{a \cdot x * (b \cdot y - c \cdot y) + b \cdot x * (c \cdot y - a \cdot y) + c \cdot x * (a \cdot y - b \cdot y)}{2} \quad (1)$$

where "a" represents the first key-point 1001, "b" represents the second key-point 1002, and "c" represents the third key point 1003.

Figure 10C:
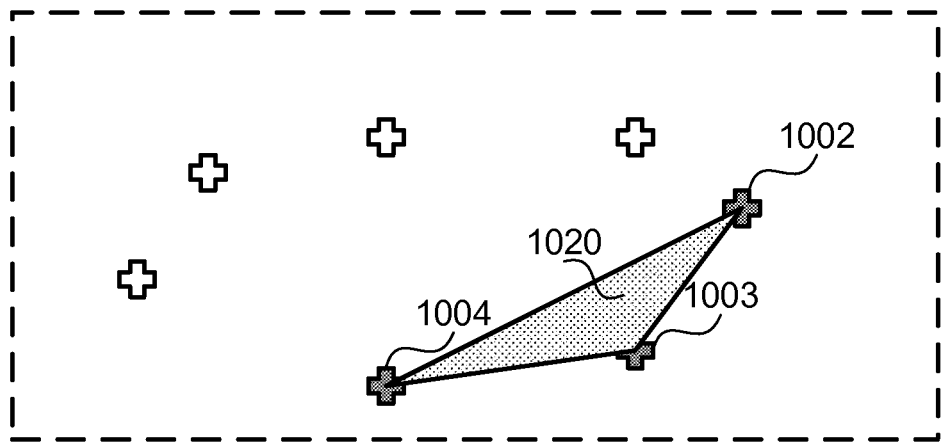
FIG. 10C shows an alternate triangle formed by a further three selected key points of the image of FIG. 10A.
Figure 11A:
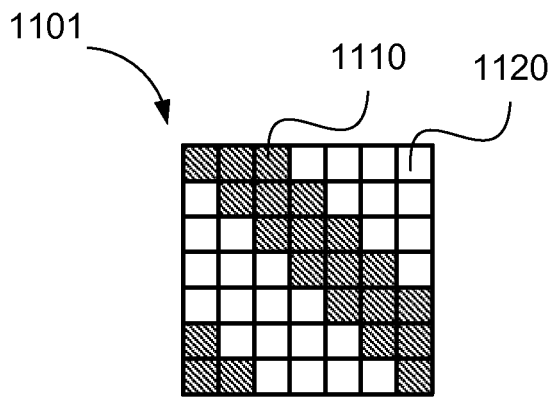
FIGS. 11A, 11B, 11C, 11D and 11E each show a sequence of values represented using a bit mask.
Figure 11B:
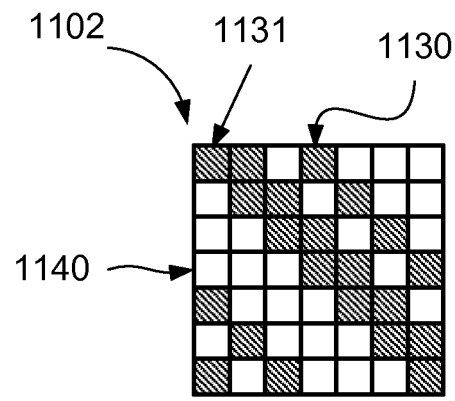
Figure 11C:
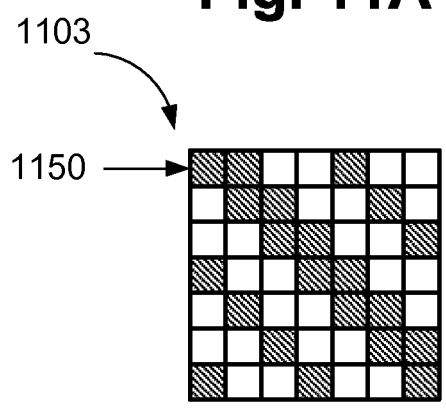
Figure 11D:
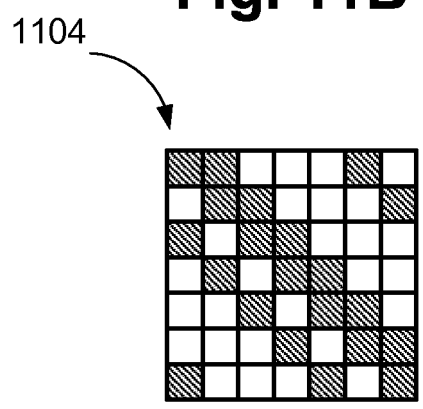
Figure 11E:
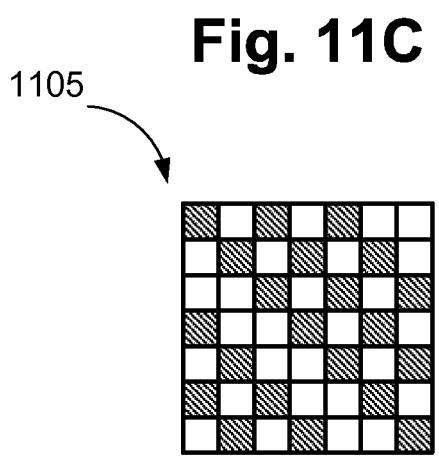

FIG. 10C shows a second triangle 1020. The area of the second triangle 1020 is based on the second key point 1002, the third key point 1003, and the fourth key point 1004.

A total area is then determined at step 230 by summing all of the determined triangle areas. For example, the area of the triangle 1010 and the area of the triangle 1020 may be summed at step 230. For each triangle, the area of the triangle is divided by the total area to give a normalized area. The normalized area is determined since the normalized area is invariant to affine distortions of the key-point location, such as rotation, scaling, and skew. Affine distortion is the expected distortion in the image received at step 110. Therefore, expected distortion of the set of key points should produce similar feature vectors.

Following step 230 the method 200 proceeds to sequence determining step 240 where the processor 1305 is used for determining a periodic sequence of the determined values based on the order of the plurality of points in the set of ordered key points. As described below, the periodic sequence is phase variant and the phase variant periodic sequence is used to generate a feature vector that is phase invariant to a starting point of the ordered plurality of key points in the set. The sequence of values may be determined by the processor 1305 and stored in memory 1306. The sequence of values is determined such that a rotation of a key-point produces a rotation (i.e., change in phase) of the sequence.

The sequence of values may be determined at step 240 through a search of all possible sequences of the normalized triangle areas. A plurality of such sequences of normalized triangle area values may be determined, with each sequence containing a unique subset of the values determined at step 230. The processor 1305 may be used for determining the further periodic sequences of values at step 240.

An example of the sequences of values, as determined at step 230, will now be described with reference to FIGS. 11A to 11E. In the example of FIGS. 11A to 11E, there are seven key-points. FIGS. 11A to 11E each show a sequence of values 1101, 1102, 1103, 1104, and 1105, respectively, represented using bit masks. The sequences 1101, 1102, 1103, 1104, and 1105 may be generated using three points from the seven key points. The five unique sequences 1101, 1102, 1103, 1104, and 1105, each contain seven triangles. Selected key points which determine a triangle are denoted in FIGS. 11A to 11E using shaded blocks (e.g., 1110). Unselected key points are denoted using unshaded blocks (e.g., 1120). Each column (e.g., 1130) of the sequences (e.g., 1102) represents a key point in the ordered set of key points. For example, the first column 1131 of sequence 1102 represents the first key point. Similarly, the third column 1130 of sequence 1102 represents the third key point.

Each row (e.g., 1140) of a sequence (e.g., 1102) in the example of FIGS. 11A to 11E indicates a single value calculated as the normalized area of the triangle formed using the selected (i.e., shaded) key points. The rows are ordered as to provide the property that rotation of the key points causes a rotation of the sequence of values. For example row 1150 of the third sequence 1103 is highlighted as the first value of the sequence 1103. The selected key points, shown shaded, are the first, second and fifth key points. Each possible combination of three key points exists in one of the five sequences 1101 to 1105. A particular sequence (e.g., 1101) may not be transformed into another sequence (e.g., 1102) by reordering the rows, or by rotating the columns of the sequence 1101.

Figure 2:
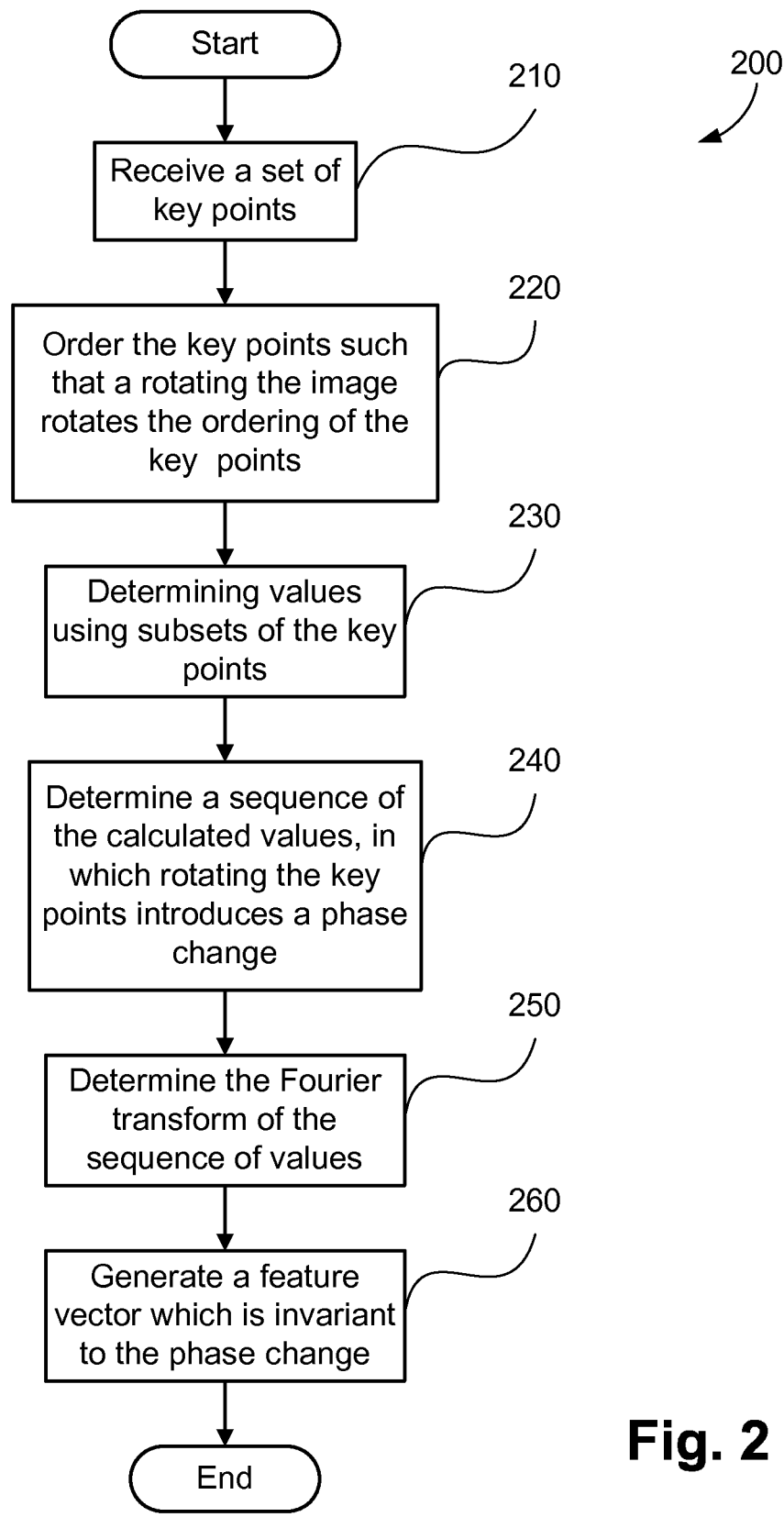
FIG. 2 is a schematic flow diagram showing a method of generating a feature vector based on a set of key points.

Following step 240 the method 200 proceeds to steps 250 and 260 as shown in FIG. 2. Steps 250 and 260 are described with reference to a single sequence of values. However, steps 250 and 260 may be repeated for all of the possible sequences of values determined for the set of key points received at step 210, and the result of the repeated steps concatenated.

After determining the sequence of values at step 240, the method 200 proceeds to determining step 250, where a frequency domain representation of the sequence of values is determined using a discrete-time Fourier transform. The frequency domain representation may be stored in the memory 1306 by the processor 1305. The Fourier transform is used to separate the phase values of the sequence of values from the magnitude information. The phase values depend on rotation of the sequence of values (and therefore, the rotation of the key-points of the sequence). However, the second order difference of phase values determined in step 250 is invariant to the starting position of the sequence of values. The magnitude information does not depend on rotation of the sequence of values.

Following step 250 the method 200 proceeds to vector generating step 260 where the processor 1305 is used for generating a feature vector for one of the key points from the frequency domain representation of the periodic sequence determined at step 250, the feature vector being invariant to rotation with respect to the plurality of key points. The feature vector may be generated by discarding the phase values of the Fourier transform. The feature vector comprises magnitude values of the Fourier transform. The Fourier magnitude values may be returned to the method 100 as the feature vector.

As described above, steps 250 and 260 may be repeated for remaining unique sequences of values, and further feature vectors generated. In this instance, the processor 1305 may be used at step 260 for concatenating the further feature vectors to form a larger feature vector. The feature vector generated in accordance with the method 200 is invariant to rotation of the plurality of key points in the ordered set of key points, and is thereby invariant to rotation of the image received at step 110.

The second order difference of phase values determined in step 250 is invariant to the starting position of the sequence of values. In an alternative arrangement, at step 260, the second order difference values may be determined, and the processor 1305 used for concatenating the second order difference of phase values with the magnitude values to form a feature vector. In this instance, the feature vector represents a combination of the magnitude and the second order difference of phase.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of generating a feature vector for an image, the method comprising:
    determining values from a plurality of points in a region of the image, each of the values being determined using at least two of the plurality of points;
    determining a periodic sequence of the determined values based on an order of the plurality of points, the periodic sequence being phase variant to a starting point of the ordered plurality of points, the order of the plurality of points being determined according to a predetermined rule; and
    generating the feature vector for one of the points from a frequency domain representation of the periodic sequence, the feature vector being invariant to rotation with respect to the plurality of points.

2. The method according to claim 1, wherein the feature vector comprises magnitude components of a Fourier transform.

3. The method according to claim 1, wherein the feature vector represents a second order difference of phase.

4. The method according to claim 3, further comprising concatenating the second order difference of phase with magnitude values.

5. The method according to claim 1, wherein the determined values represent areas of normalized triangles.

6. The method according to claim 1, wherein the points are locations of words.

7. The method according to claim 1, wherein the points are locations of letter extenders.

8. The method according to claim 1, wherein the points are locations of letter descenders.

9. The method according to claim 1, further comprising determining further periodic sequences.

10. The method according to claim 9, further comprising generating further feature vectors and concatenating the further feature vectors to produce a large feature vector.

11. The method according to claim 1, further comprising: matching the generated feature vector with one or more other feature vectors; accumulating scores based on matching feature vectors; and identifying a document based on the accumulated scores.

12. An apparatus for generating a feature vector for an image, the apparatus comprising:
- module for determining values from a plurality of points in a region of the image, each of the values being determined using at least two of the plurality of points;
- module for determining a periodic sequence of the determined values based on an order of the plurality of points, the periodic sequence being phase variant to a starting point of the ordered plurality of points, the order of the plurality of points being determined according to a predetermined rule; and
- module for generating the feature vector for one of the points from a frequency domain representation of the periodic sequence, the feature vector being invariant to rotation with respect to the plurality of points.

13. A system for generating a feature vector for an image, the system comprising:
- a memory for storing data and a computer program;
- a processor coupled to the memory for executing said computer program, said computer program comprising instructions for:
    - code for determining values from a plurality of points in a region of the image, each of the values being determined using at least two of the plurality of points;
    - code for determining a periodic sequence of the determined values based on an order of the plurality of points, the periodic sequence being phase variant to a starting point of the ordered plurality of points, the order of the plurality of points being determined according to a predetermined rule; and
    - code for generating the feature vector for one of the points from a frequency domain representation of the periodic sequence, the feature vector being invariant to rotation with respect to the plurality of points.

14. A non-transitory computer readable medium having a computer program stored thereon for generating a feature vector for an image, the program comprising:
- code for determining values from a plurality of points in a region of the image, each of the values being determined using at least two of the plurality of points;
- code for determining a periodic sequence of the determined values based on an order of the plurality of points, the periodic sequence being phase variant to a starting point of the ordered plurality of points, the order of the plurality of points being determined according to a predetermined rule; and
- code for generating the feature vector for one of the points from a frequency domain representation of the periodic sequence, the feature vector being invariant to rotation with respect to the plurality of points.

* * * * *